(12) United States Patent
Takaoka

(10) Patent No.: US 6,491,962 B2
(45) Date of Patent: Dec. 10, 2002

(54) PROCESS OF COLLECTING YOUNG LEAVES OF RICE PLANT AND ITS PROCESSING METHOD, PROCESSED GOODS AND FOODS

(76) Inventor: Terumi Takaoka, 2225-1, Oaza Sunouchikou, Kawauchi-cho, Onsengun, Ehime (JP)

( * ) Notice: Subject to any disclaimer, the term of this patent is extended or adjusted under 35 U.S.C. 154(b) by 190 days.

(21) Appl. No.: 09/760,090

(22) Filed: Jan. 13, 2001

(65) Prior Publication Data

US 2002/0094368 A1 Jul. 18, 2002

(51) Int. Cl.⁷ .............................. A23K 1/14; A23K 3/02; A23L 1/212; A23L 3/26
(52) U.S. Cl. ...................... 426/615; 426/456; 426/618; 426/623; 426/630; 426/636; 426/640; 426/809
(58) Field of Search ................................. 426/615, 623, 426/630, 636, 809, 456, 640, 618

Primary Examiner—Helen Pratt
(74) Attorney, Agent, or Firm—Moonray Kojima

(57) ABSTRACT

The present invention relates to the healthy supplementary foods and the technology for making them by enabling the efficient collection of young leaves of rice plant rich in nutrition and processing without losing nutrition characteristic of young leaves of rice plant. Collection of young leaves of rice plant consists in cutting young leaves 2 of the upper side only while leaving the below part of the rice plant when rice plant has grown so old as to be in ears or just before this, allowing for cutting the remaining young leaves after they have grown again after passing a certain period of time. This step will be repeated several times.

The young leaves 2 cut out will be pre-processed appropriately like cleaning before they are far infrared dried to contain a given volume of water, thus refraining, for instance, the destruction of the useful compounds- in the young leaves 2 of rice plant. The first processed food after being far infrared dried may be preserved, pulverized or put to other appropriate processes to make the desired processed food 4 or other foods.

7 Claims, 7 Drawing Sheets

PROCESS OF COLLECTING YOUNG LEAVES OF RICE PLANT AND ITS PROCESSING METHOD, PROCESSED GOODS AND FOODS

BACKGROUND OF THE INVENTION

1. Description of the Prior Art

The present invention relates to the method for collecting young leaves of rice plant rich in nutrition and the technology of making the nutrition contained in young leaves of rice plant absorbed into the human body.

2. Prior Art

There may be no technology capable of making young leaves of rice plant absorbed into the human body. However, as for the wheat belonging to the same family, there is a technology for making use of the young leaves of that plant as healthy supplementary foods, whose example is the Japanese Patent No. 2544302.

According to this prior art, young leaves of wheat are heated with hot water mixed with salt and baking soda after being collected and washed with water and afterwards they are cooled by cool water and dried at the temperature between 65 and 85° C. so that they are pulverized and sterilized.

However, according to this method, there is a problem that nutritious values can easily be lost as young leaves of wheat are exposed to a high temperature when drying.

In addition, the collection of young leaves of wheat involves rooting up the whole plant of young leaves which have fully grown up and selecting necessary parts of young leaves even though the necessary parts are the upper side of the young leaves, thus remaining bad efficiency at the time of collecting the plants.

As for the above technology adopted to collect the young leaves of rice plant, the same problems can be suggested.

SUMMARY OF THE INVENTION

The first purpose of the present invention is to collect the young leaves of rice plant efficiently.

In other words, in the act of collecting the young leaves on the upper side of the rice plant before they come into ears, the first step of collecting the young leaves with the down part of the plant undone is to be followed by the collection of the young leaves of the down part, which step is counted as (1+n) times. In this case, the above n is a natural number.

Therefore, when the young long leaves of rice plant are to be cut off before they come into ears. The collection of the young leaves of rice plant is done when rice plant has grown as long as 60 to 80 cm, cutting, for example, part of the plant 30 cm above the ground.

After the step of collecting the young leaves of rice plant, rice plant immediately starts growing young leaves from the remaining down part and it grows. In one or two weeks, young leaves grow so long as to be cut, then moving to the second step of cutting and accordingly to the third step of cutting and to the (1+n) times step and a plurality of steps of cutting. Therefore, young leaves of rice plant can be obtained for several times, thus allowing for good efficiency.

The second purpose of the present invention is not to harm the nutrition in the young leaves of rice plant.

Therefore, young leaves of rice plant, which were collected as above, will be dried far infrared so that they will contain a given amount of water, according to the proposed method.

In other words, far infrared drying process with far infrared ray allows for high efficiency by drying from inside without exposing the young leaves to air, providing for active reaction other than drying them fully without raising the temperature. For this reason, by setting the temperature at the middle level, the loss of the nutrition will be held back so that the nutrition, which has been impossible to take, will be readily absorbed.

The third purpose of the present invention is to take good nutrition out of the young leaves of rice plant.

In other words, its purpose is to provide processed foods made from young leaves of rice plant, pulverizing to a given size the first processed foods of the young leaves of rice plant which was made by a far infrared process as mentioned above and also the processed foods of young leaves of rice plant, which foods are formed as a pill or a granule being made of the pulverized foods and the foods produced by mixing the above mentioned pulverized and processed foods of young leaves of rice plant into the appropriate stuff like grains.

In other words, according to the above mentioned processed foods of young leaves of rice plant, they can be easily taken, mixed together with water or with the help of water or mixing or spreading with other foods.

In addition, according to the above mentioned foods, they may be mixed with powder of kale used in green juice called "Aojiru", beans, sesame and germinating rough rice and others and after being thus processed they become easy to eat and take like cakes or drinks and they may be mixed with flour and cooked as noodles, offering various ways of eating.

Other purposes of the present invention will be easily clarified according to the examples mentioned below.

DESCRIPTION OF THE PREFERRED EMBODIMENT

One example of the present invention will be more particularly described using the figures below.

Figure 1:
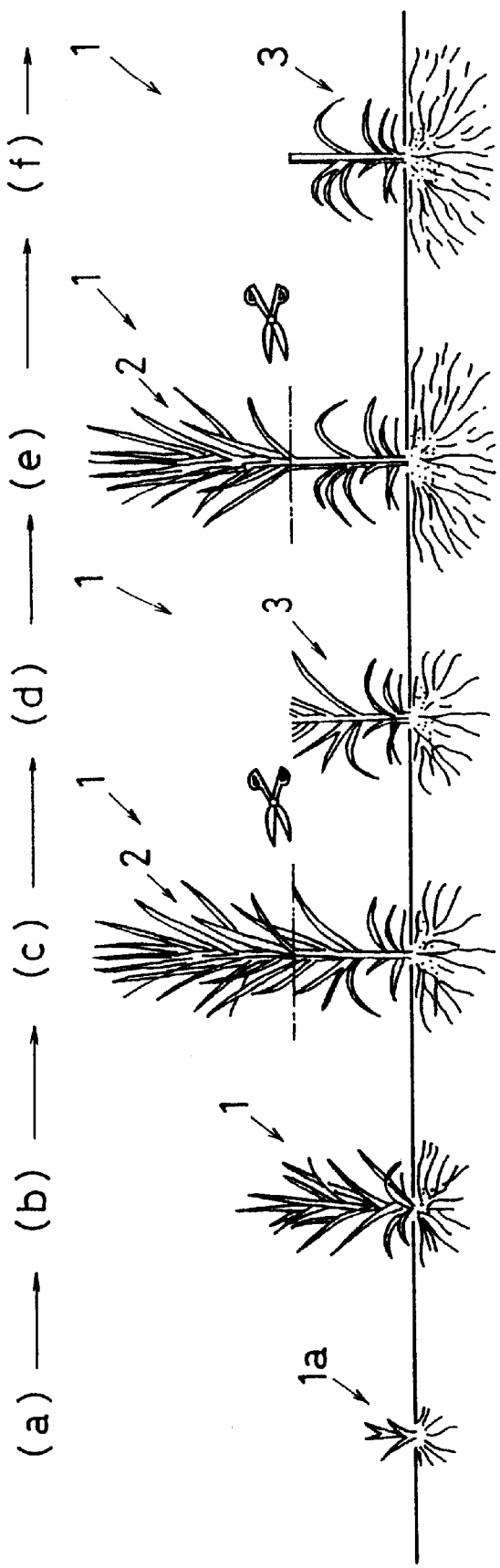
FIG. 1 is a diagram showing the way of collecting young leaves of rice plant
Figure 2:
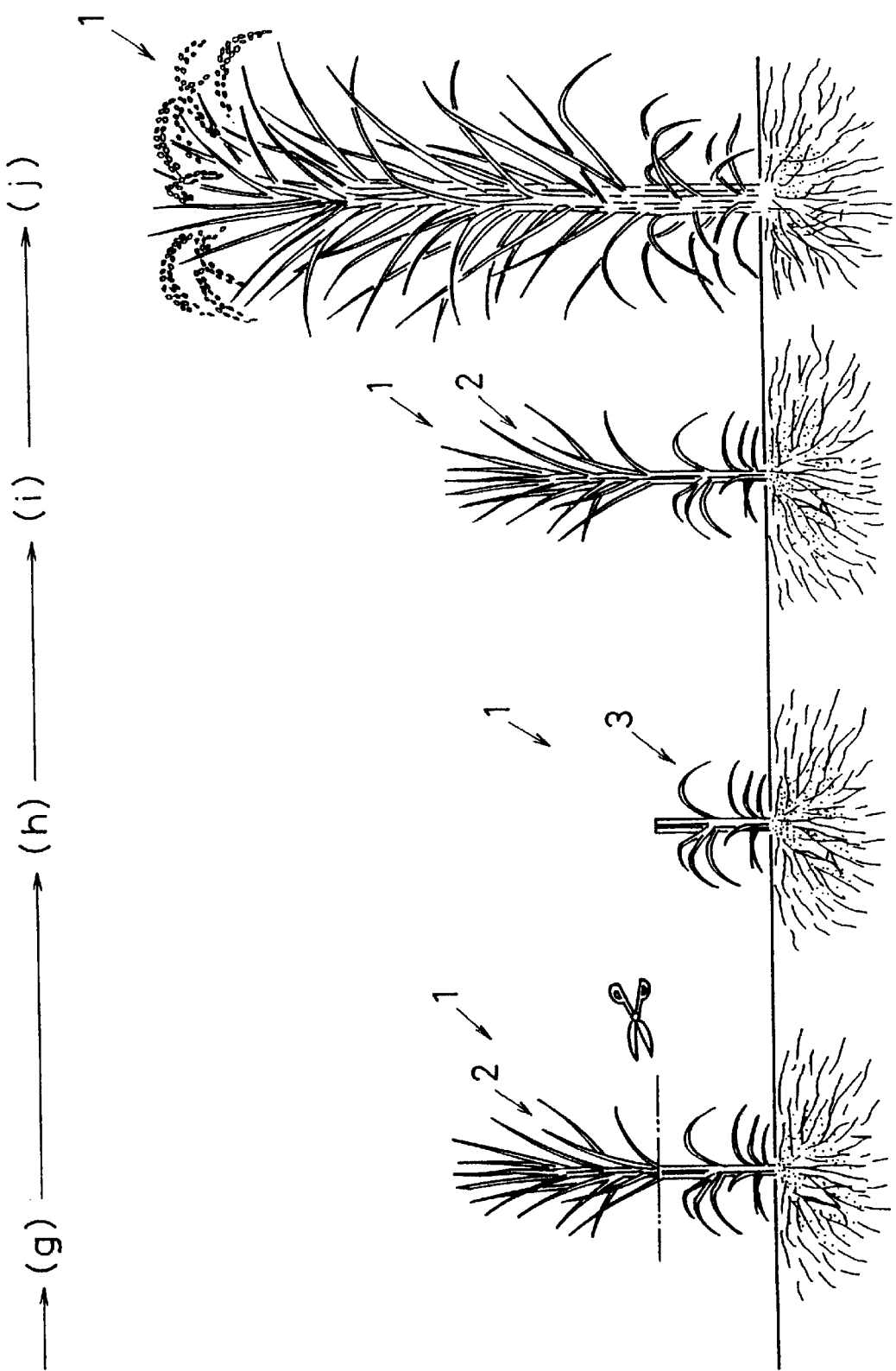
FIG. 2 is a diagram showing the way of collecting young leaves of rice plant

The FIGS. 1 and 2 show the method of collecting young leaves of rice plant according to the growing steps of rice plant.

When the young plant 1 a of rice 1 grown so far from germination is planted in the field (a), it starts to grow more and begins to have branches (b). When plantation is done, young plant of rice should be deeply dipped into water and after a while it will be intermittently irrigated and dried in the middle step in an ordinary way of watering. In addition, in order to prevent weeds from growing and hampering the growth of rice plant, the rice bran or the anti-weeds stuff (not shown in the figure), which is made from the rice bran for being used as organic anti-weeds stuff, will be spread over the field. The spreading of the anti-weeds stuff or rice bran may be done by mixing those stuffs into water from the water outlet of the field or using the spreader for that purpose.

Anti-weeds stuff covers the water surface of the field, preventing light and the growth of weeds and when the stuff is decomposed by the bacteria inside water, it serves as a fertilizer. Besides rice bran, wheat bran, soybeans(Daizusoh) and colza oils may be used and they can be appropriately combined to make pellets. The spreading of the anti-weeds stuff will be done afterwards, for the ears of wheat and also for the time of ripening.

Rice plant 1 grows stalks and leaves upon entering the period of many branches and after that period it will enter the period of the most branches and turn to the formation of ears of rice.

Before the most branches are seen with rice plant, which will be in ears, young leaves 2 on the upper part of the rice plant 1 are to be cut and collected (The first step of cutting the young leaves. c). The height of rice plant becomes about as tall as 60–80 cm so that the young leaves 2 can be collected while the cutting is done about 30 cm above the ground. The cutting out can be done both manually and by the cutting machinery accordingly. The young leaves 2, which have been cut out, will be subject to the desired process.

As for the collection of the young leaves as mentioned above, they may be cut altogether once at a given length, however, they may be cut each time from 4 to 7 cm so that cleaning and drying operations can be easily done.

Furthermore, rice plant 1 is intermittently irrigated or eventually dried in the middle step, however, when rice plant is collected, water is removed out of the paddy rice field. After collection of young leaves are cut out (d), the rice field will be filled with water again. By ridding the paddy rice field of water, deoxidization of the rice field soil will be prevented, thus providing for good conditions of the root. In addition, filling the rice field with water means providing fresh water to the rice plant so that the stalks will get strong by vitality of the rice plant 1 itself with its root firmly rooted.

Rice plant 1 with young leaves 2 cut will make a cultivating bed out of the stock side which was left uncut, wherein it grows young leaves 2 immediately to become so long as when it was cut one or weeks before (e) Before they are in ears, the young leaves 2 will be cut in the same location (the second step of cutting) and the young leaves 2, which have grown, will be cut and collected again (f). In this case also, the watering is to be done as in the previous manner.

After the young leaves 2 were cut again, the rice plant 1 will make a cultivating out of the stock side as mentioned above, wherein it grows young leaves 2 immediately (g) and before they are in ears, the young leaves 2 will be cut again (the third step of cutting) and the young leaves 2, which have grown, will be cut and collected again (h).

The cutting out operation of the young leaves like this has been done three times, but it may have been twice or four or five times. Every time the young leaves are cut, the stalk becomes stronger and the root will be firmly rooted.

Consequently, after the last cutting is done, the young leaves 2 begin to grow again (i) and should continue to grow as usual. Thus, they begin to be in ears and begin to form pollens and as they begin to be in ears, they flourish, get pollinated and move to the pique of ripening (j) so that without cutting the young leaves 2, according to its growth, they receive water by intermittent irrigation after getting dipped into water for a certain period of time. After this, rice plant will be harvested.

In this way, the young leaves can be collected several times for one life of the rice plant 1 wherein the rice can be collected finally. In addition, for the growth of rice plant 1, no agricultural medicines or fertilizers are to be used but organic materials like rice bran are being used to exert the effects of anti-weeds stuff and fertilizer so that rice plant 2 and rice become very safe as young leaves 2 require no strong cleaning and they are convenient and ready to be processed.

As the young leaves 2 are cut, rice plant becomes strong in respect of self-preservation and tough against diseases and less vulnerable to wind and hard to be brought down thereby, thus providing for strong rice plant 1. Rice made out of this kind rice plant 1 is good in quality.

In other words, good rice making with many good effects can be obtained by massive collection of young leaves 2 and rice harvest together with strong rice plant 1 refraining damage by typhoon.

Here is below the method of processing young leaves 2 of the rice plant 1 collected in the above said manner.

In the FIG. 3 there is shown a flowchart of the processing method, which will be explained below.

After the above said collection of young leaves is done (Step n 1), when the rest of the given length of the young leaves is not cut for several times, the appropriate length of the leaves for operations like cleaning in the following steps should be 4–7 cm when cutting. (Step n 2). When the rest of the given length of the young leaves is cut for several times, the above mentioned cutting step n 2 will be omitted but move to the next step of cleaning n 3.

In the step n 3 of cleaning, young leaves grown to become appropriately long may be washed with water and rid of unnecessary leaves or impurities.

After the young leaves are rid of water, they will be steamed (the step n 4 of heating). This step of steaming may be omitted but, as young leaves of rice plant or wheat are stiff, this step may be good in order to soften the fibers. In stead of steaming, the young leaves may be dipped into hot water and heated, however, steaming is more effective in sterilization and has the merit of maintaining nutritious elements. In other words, when dipped into water, water-soluble elements are easy to melt down while in case of steaming they will not be melted out.

The steaming temperature must be preferably as low as about 100 centigrade lasting 30 to 40 seconds in order to reduce the loss of the nutritious elements in the young leaves.

As for the devices, there may be used a general type of a steaming device other than steaming machinery often used when steaming, for example, tea leaves driven by screws when carrying them.

Next is the step of sterilization (step n 6). As for sterilization, the young leaves may be dipped into sterilizing water mixed with hypo soda chlorate in an appropriate density. For other medicines, citric acid and high-class bleaching powder composing an adequate agent for making water of weak acid function can be used and after dipping into sterilizing water for a certain period of time, the leaves will be washed clean.

In addition, sterilization and the above said cleaning step can be done at the same time and after cleaning with water, the step n 5 of sterilization may be omitted if the leaves have been sterilized in the sterilizing water and consequently washed with water. Furthermore, the above said steaming step and sterilizing step can be replaced with each other in respect of its order.

After the leaves are washed with water, they will be pre-dried (step n 6 of pre-drying). This pre-drying step may be done between 40 and 45 centigrade of the middle temperature. This pre-drying step is to be carried out for about five to 10 hours varying according to the volume of the leaves. The temperature of the young leaves to be processed will be kept at about 25 centigrade as the leaves are to be dried without being exposed to a high temperature.

When the young leaves become apt for being subject to the rough pulverization in the latter step, for example after the young leaves have been dried to such a point as to contain about 10% or more, the leaves will be roughly pulverized to small pieces of an appropriate size (step n 7 of rough pulverization). According to the above said pre-drying, as the temperature of the young leaves will kept as low as about 25 centigrade, the leaves do not need to be cooled taking much time. For this reason, the operation will be carried out smoothly.

In this rough pulverization, in order to carry out the far infrared drying evenly on the material in the latter steps, the young leaves should not intermingle with each other but move freely so that the length of each piece should be as small as about 1 to 5 cm.

In the next step of far infrared drying (step n 8), the young leaves 2 should be evenly dried enough and the leaves will be far infrared dried to such a point as to contain a given amount of water. The young leaves will be dried according to the FIG. 2, for instance, wherein a plurality of steps composing the belt conveyors 10 and 11 at different levels drive them. This is possible because the process will be one flow like a line. In addition, when the young leaves are sent from the belt conveyor 10 in the fore step to the belt conveyor 11 in the latter step, the young leaves I and so on will be automatically reversed, allowing for even drying. In the figure, 12 indicates the far infrared ray generating device, while 13 is a ceramic bar and 14 is a dichromic wire which can be applied by an electric current. In addition, other methods like drying the young leaves while stirring them inside the rotating drum can be adopted.

This far infrared drying step may preferably be done, for example, between the 40 to 45 centigrade of the middle temperature, lasting, for instance, about 5 to 7 minutes.

In other words, the above said water-containing volume may be already determined, however, when the young leaves are to be processed in various ways, according to its purpose, that volume can vary.

Figure 3:
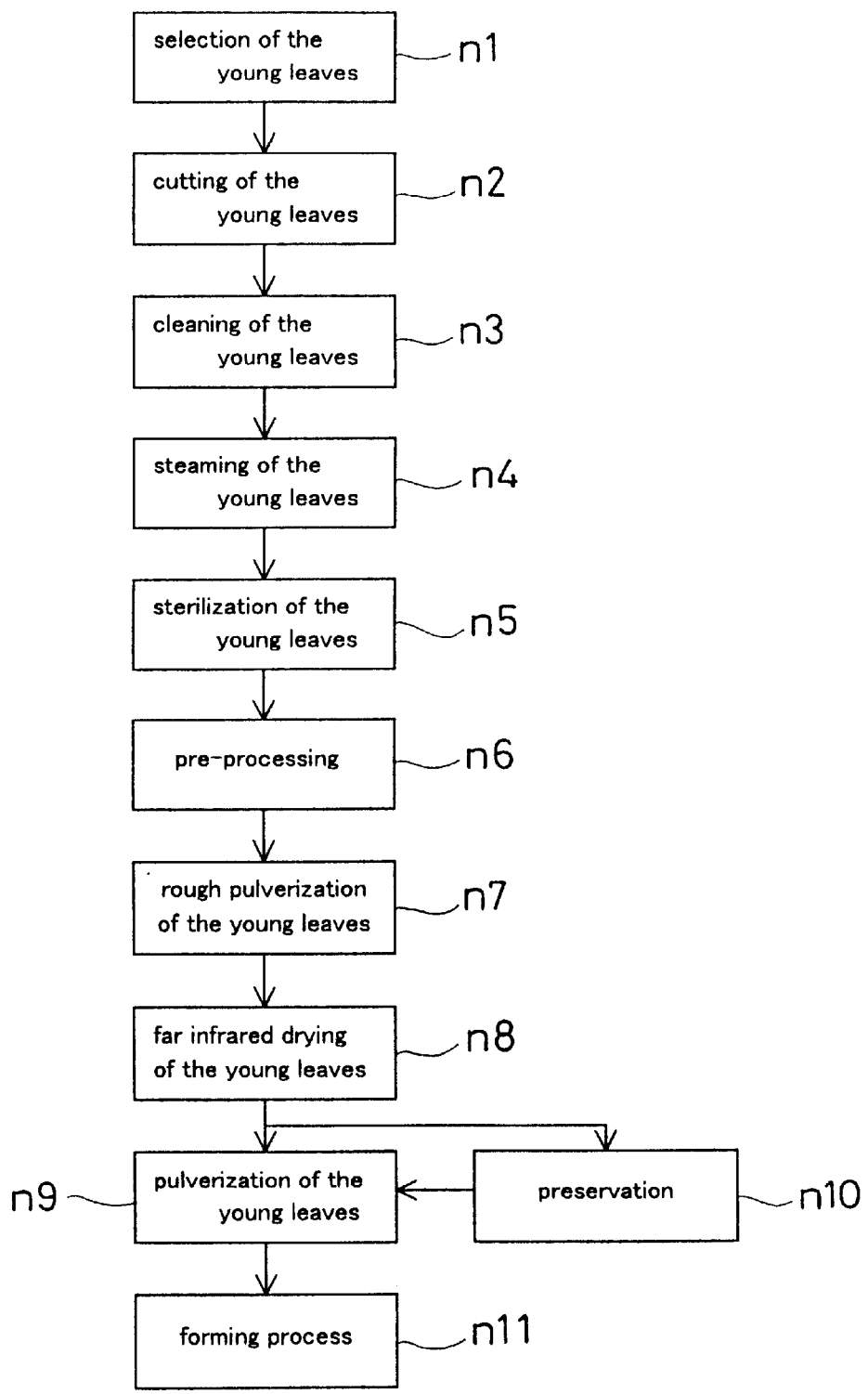
FIG. 3 is a flowchart of the method of processing young leaves of rice plant
Figure 4:
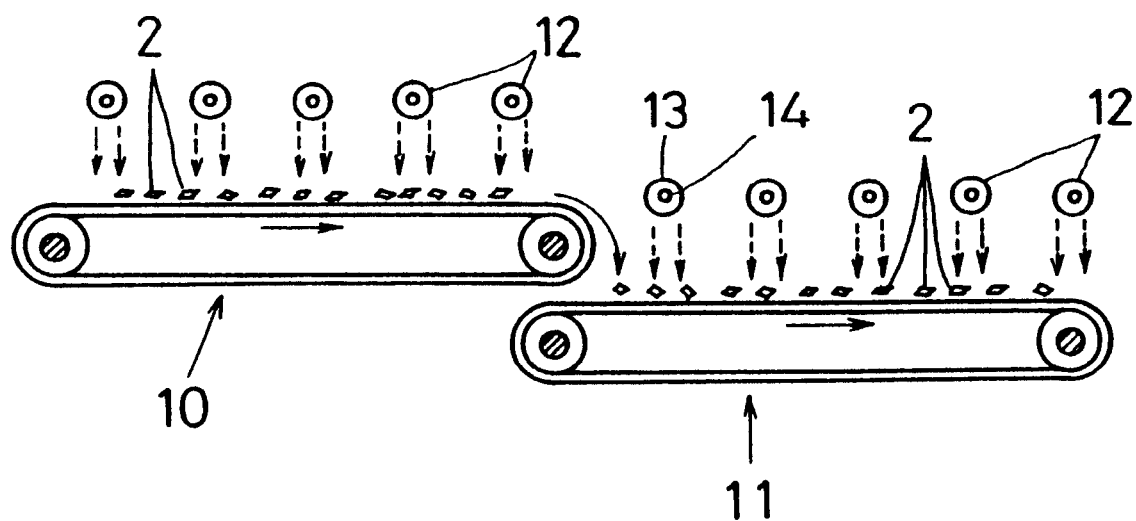
FIG. 4 is a constructional view showing one example of far infrared drying
Figure 5:
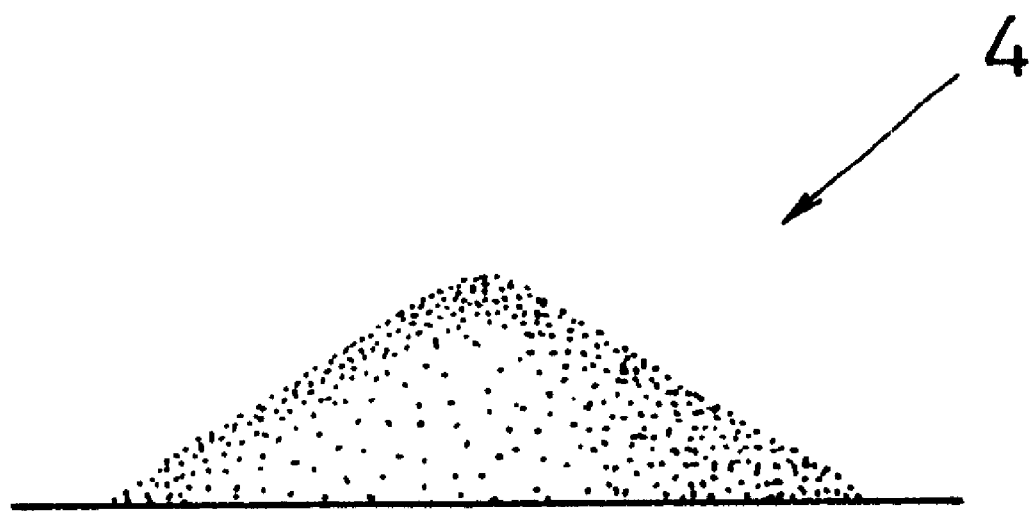
FIG. 5 is a plan for one example of the processed food of young leaves of rice plant
Figure 6:
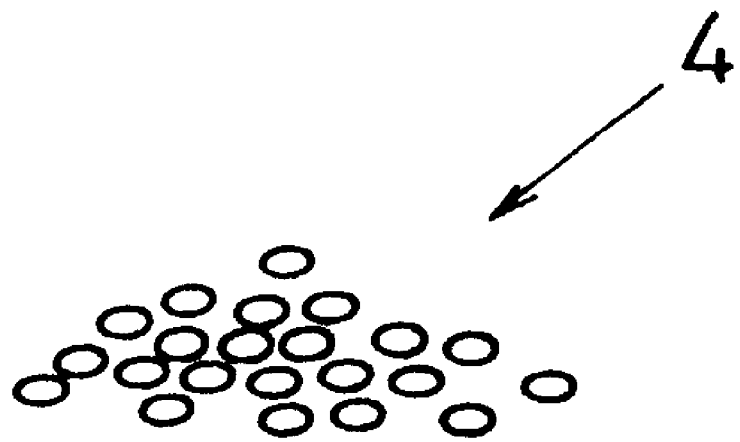
FIG. 6 is a plan for one example of the processed food of young leaves of rice plant
Figure 7:
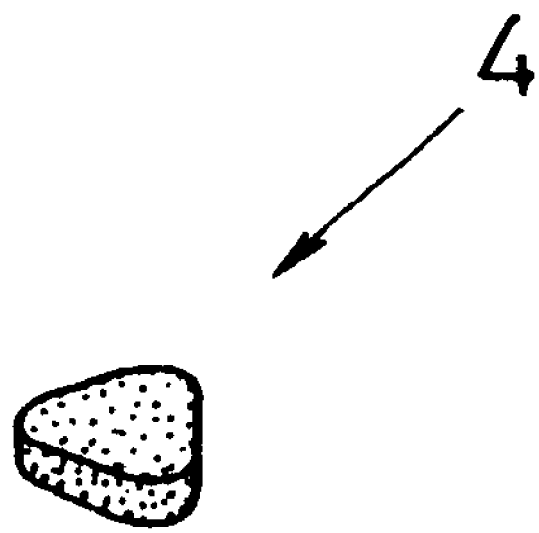
FIG. 7 is a plan for one example of the processed food of young leaves of rice plant

The water containing volume may be about 10% in order to become soluble in water as the leaves are to be used for the processed food 4 of young leaves of rice plant in powder as shown in the FIG. 3 while the volume may be about 3% as the leaves are to be used for the processed food 4 of young leaves of rice plant in the shape of a granule as shown in the FIG. 4 or the processed food 5 in the shape of a pill.

As for the young leaves having been far infrared dried (the first processed food), they are pulverized (the step n 9 of pulverization) to a certain size when they are to be edible enough, otherwise they should be preserved so that they will not change in quality (Step n 10).

As for preservation, the young leaves must be vacuum-wrapped by a bag made of aluminum vapor film or wrapped with the drying agent to be preserved in a cool and dark place like in a refrigerator with a temperature set to 15 centigrade around, for instance.

The young leaves pulverized in the step 9 will be wrapped as they will be eaten in a state of powder, or if they are to be made a granule or a pill, they will be formed (step n 11 of forming step). When the young leaves of rice plant are to be processed in various way (4), the above mentioned pulverization will be made to the proposed size. When they are to be pulverized, they should be so fine as to be like powdered green tea in more than 200 meshes and when they are to be formed in a granule or a pill, they should be pulverized in 150 meshes.

The processed food of the young leaves 2 produced in the above manner is pre-dried (step n 6) and far infrared dried (step n 8) and by those two steps they are to be dried at once with the high temperature while reducing the loss in the nutrition characteristic of the young leaves of rice plant. In addition, in the step of far infrared drying the process is made by far infrared ray so that there is no effect of air, providing for enough drying without elevating the temperature too high, thus bringing active reaction. For this reason, if the temperature is set at middle temperature as in the above statement, it is possible also to reduce the loss in the nutrition, allowing for absorption of nutrition, which used to be impossible.

In the case of the young leaves of rice plant after being processed and manufactured to make food as described above, protein, fat, fiber, sugar and ash are included in large quantity and as for vitamin, carotene, vitamin A, vitamin B2, vitamin C and vitamin E are included wherein as for minerals, sodium, potassium, calcium, iron and others are also included therein.

Furthermore, as for the young leaves of rice plant or wheat to be used for material, they are rich in nutrition especially in the step of nutritious aspects, however, they have not been used sufficiently, but by making the most of the above mentioned process, various types of healthy supplementary goods or foods come to be manufactured.

For instance, besides forming the processed foods of the young leaves alone, they may be mixed with additives like powder of kale used for green juice called "Aojiru", beans, sesame, germinating wheat, other than making noodles after mixing the leaves with flour or other things. The processed foods of young leaves of rice plant in the shape of a granule may be put into chocolate and those foods may be mixed in to the baking cake based on the germinating rough rice to make a new cake, thus providing for various types of healthy supplementary goods or foods upon engineering.

What is claimed is:

1. Method of collecting young leaves of rice plant comprising a step 1 of cutting the young leaves of the upper part of rice plant before they are in ears, remaining the lower part of the same, and also a step (1+n) of cutting young leaves grown from the bottom of the rice plant after the above said first step of cutting, wherein the above n is a natural number.

2. Method of collecting young leaves of rice plant according to claim 1, wherein a given length of the leaves to collect will be cut from the top for several times in the step of the above mentioned cutting.

3. Processing method of young leaves of rice plant, wherein young leaves of rice plant collected according to the above-mentioned method of claim 2 will be far infrared dried to such a point that they will contain a given amount of water.

4. Processed food of young leaves of rice plant, wherein the processed food of young leaves of rice plant according to claim 3 is made in the shape of a granule or a pill.

5. Food made by mixing the processed food of young leaves of rice plant according to claim 3 into the appropriate material like grains.

6. Processing method of young leaves of rice plant, wherein young leaves of rice plant collected according to the above-mentioned method of claim 1 will be far infrared dried to such a point that they will contain a given amount of water.

7. Processed food of young leaves of rice plant, wherein the first processed food of young leaves of rice plant produced by utilizing the above-mentioned method of claim 6 is to be pulverized to the given size.

* * * * *